United States Patent
Laws

(10) Patent No.: US 11,239,906 B2
(45) Date of Patent: Feb. 1, 2022

(54) BEAM HOPPING SYNCHRONIZATION SYSTEM

(71) Applicant: AIRBUS DEFENCE AND SPACE LIMITED, Stevenage (GB)

(72) Inventor: Steve Laws, Portsmouth (GB)

(73) Assignee: Airbus Defence And Space Limited, Stevenage (GB)

( * ) Notice: Subject to any disclaimer, the term of this patent is extended or adjusted under 35 U.S.C. 154(b) by 6 days.

(21) Appl. No.: 16/760,997

(22) PCT Filed: Nov. 28, 2018

(86) PCT No.: PCT/GB2018/053438
§ 371 (c)(1),
(2) Date: May 1, 2020

(87) PCT Pub. No.: WO2019/106357
PCT Pub. Date: Jun. 6, 2019

(65) Prior Publication Data
US 2020/0313760 A1 Oct. 1, 2020

(30) Foreign Application Priority Data
Nov. 28, 2017 (EP) .................................. 17275189

(51) Int. Cl.
*H04B 7/185* (2006.01)
*H04B 7/204* (2006.01)

(52) U.S. Cl.
CPC ....... *H04B 7/2041* (2013.01); *H04B 7/18515* (2013.01); *H04B 7/18517* (2013.01)

(58) Field of Classification Search
CPC ............ H04B 7/18515; H04B 7/18517; H04B 7/2041
See application file for complete search history.

(56) References Cited

U.S. PATENT DOCUMENTS

| | | | |
|---|---|---|---|
| 8,144,643 B2* | 3/2012 | Miller | H04B 7/2041 370/321 |
| 8,195,090 B2* | 6/2012 | Treesh | H04B 7/2041 455/13.2 |
| 8,218,476 B2* | 7/2012 | Miller | H04B 7/18541 370/321 |
| 9,356,685 B2* | 5/2016 | Angeletti | H04B 7/2041 |

(Continued)

OTHER PUBLICATIONS

Satixfy: Beam Hopping—How to Make it Possible: (Part 2)—SatixFy innobeam-hopping-make-possible-part:, Jul. 30, 2017, URL:http://www.satixfy.com/beam-hopping_-make-possible-part-2 [retrieved on May 29, 2018].

*Primary Examiner* — Alpus Hsu
(74) *Attorney, Agent, or Firm* — Blank Rome LLP

(57) ABSTRACT

An improved procedure and associated hardware to allow a satellite to switch antenna coverages according to predefined repetitive sequences and to align switching of the antenna sequence with ground data sequence switching. The principle of synchronisation of the sequence switching is based on the anticipation of the exact time at which change in beam hopping sequence occurs at the satellite, such that a change to a beam hopping sequence can be reflected in ground data sequence switching without losing connectivity between the satellite and ground segment.

13 Claims, 6 Drawing Sheets

(56) References Cited

U.S. PATENT DOCUMENTS

| | | | | |
|---|---|---|---|---|
| 2003/0202529 | A1* | 10/2003 | Jarett | H04J 4/00 |
| | | | | 370/437 |
| 2009/0093213 | A1* | 4/2009 | Miller | H04B 7/185 |
| | | | | 455/12.1 |
| 2016/0329953 | A1* | 11/2016 | Smart | H04B 7/0617 |
| 2017/0288769 | A1* | 10/2017 | Miller | H04B 7/18515 |
| 2017/0289822 | A1 | 10/2017 | Hreha et al. | |
| 2017/0289939 | A1* | 10/2017 | Hreha | H04B 7/18584 |
| 2020/0028575 | A1* | 1/2020 | Buer | H04B 7/18513 |

* cited by examiner

BEAM HOPPING SYNCHRONIZATION SYSTEM

CROSS-REFERENCE TO RELATED APPLICATIONS

This application is a national phase application of PCT/GB2018/053438, filed Nov. 28, 2018, which claims priority to European Application No. 17275189.3, filed Nov. 28, 2017. The entire contents of those applications are incorporated herein by reference.

FIELD

The present invention relates to synchronisation between ground and satellite segments of a communication system. Particularly, the present invention relates to the synchronisation of updates to beam coverage sequences employed in the satellite segment of the communications system with data switching employed in the ground segment of the communications system.

TECHNICAL BACKGROUND

In a satellite communications system, antenna switching sequences are typically employed in order to maximise throughput, and to optimise use of the available resources. An antenna switching sequence is defined by a set of coverages, representing the geographical area on Earth which is covered by a particular satellite beam transmitted from, or received by the antenna, at a particular time, and a corresponding set of dwell times defining the period of time for which the satellite beam should maintain a particular geographical coverage. On switching, appropriate control of beamforming networks in the satellite leads to a transmission or reception beam being directed towards the next coverage area in the sequence, for a corresponding dwell time. Switching continues in this manner until the end of the predefined sequence, at which point the sequence is restarted in the absence of an instruction to the contrary.

In this manner, a number of different ground stations at different respective locations may be in communication with the same satellite on a time division basis, ensuring all of the locations can be served by the available hardware in the satellite communications system. The switching is typically rapid, with dwell times of the order of a few milliseconds, and the switching can be employed in conjunction with power or spectrum management in order to share service resources among different regions efficiently.

The antenna switching sequence is referred to herein as a beam hopping sequence (BHS), in which a satellite beam is "hopped" between coverage areas based on a predetermined sequence of dwell times. The BHS is uploaded from a ground control centre and stored at the satellite.

In order to fully utilise the enhanced connectivity provided by such an antenna switching scheme, it is necessary to control the ground segment of the communications network in a corresponding manner. Without this, data transmitted via the uplink may not reach its destination efficiently, as, while it may be uploaded in a particular data frame, the frame itself may not be aligned with the BHS. The effect is that beam hopping may occur at the satellite at a time which is mid-frame with respect to the data switching of the ground segment, such that a ground segment data frame is transmitted partially to different coverage areas either side of a switch in the BHS, whereas it will have been intended for transmission to a single area.

For data to be transmitted, using time-division multiplexing (TDM), to a satellite employing a BHS, synchronisation is thus required between the multiplexing scheme of the ground segment of the network, and the switching within the BHS.

To provide full flexibility and control to the ground control centre, so as to adapt to changing environments, interference sources, traffic requirements, available capacity and so on, it is possible to modify a BHS by uploading a new BHS to the satellite network, so that the satellite network can adapt accordingly. There is thus a further level of synchronisation which is required between the ground segment and the satellite segment, namely the synchronisation between an update to the BHS and the data switching scheme (e.g. TDM) employed in the ground segment. Without such synchronisation, there will be a period in which data is switched at the ground segment on the basis of a different scheme from the antenna switching of the satellite segment.

COMSAT Technical Review, Volume 22 (1992) discloses a "satellite-switched time-divisional multiple access" (SSTDMA) multiplexing scheme for providing dynamic beam switching in a satellite which can be synchronised to a TDMA scheme employed in the ground segment. The SSTDMA scheme relies on structuring data frames to include sections in which synchronisation data is to be transmitted to enable an acquisition and synchronisation unit to determine synchronisation between the ground and satellite segments. The scheme therefore requires removal of a traffic-carrying portion of each data frame to accommodate such synchronisation data, and is thus unable to implement a continuous change in antenna switching because of the time which is required for the acquisition of such synchronisation data and subsequent processing.

System Synchronisation For Beam Hopping in Multi-beam Satellite Networks, by Airbus Defence and Space (Alberty et al), discloses a technique in which a new BHS can be uploaded to a satellite from a ground controller for activation at the end of a prior BHS. The projected time for application of the new beam hopping plan is sent to both the satellite and a gateway on the ground, subject to a propagation offset between the two projected application times. Alignment between the gateway and the satellite is achieved on the basis of the satellite and gateway sharing a common time reference with accuracy better than half the duration of a BHS sequence.

SUMMARY OF INVENTION

Embodiments of the present invention aim to provide an improved procedure and associated hardware to allow a satellite to switch antenna coverages according to predefined repetitive sequences, and to align switching of the antenna sequence with ground data sequence switching.

According to aspect of the present invention, there is provided a payload for a satellite comprising a plurality of beamforming networks, a communication means arranged to receive data in a data sequence from a ground segment of a communications network and to transmit the received data via a respective plurality of satellite beams created by the plurality of beamforming networks, storage means for storing a beam hopping sequence, a controller arranged to control transmission of data by the communication means according to the stored beam hopping sequence in a manner synchronised with the data sequence from the ground segment, and a synchronisation pulse generator for generating a synchronisation pulse at reset times which are observable at the ground segment, the reset times separated by a predetermined period of time derived from a master clock signal common to the satellite payload and the ground segment, wherein the controller is arranged to (i) receive an update to the beam hopping sequence from the ground segment, (ii) determine one or more of the plurality of satellite beams for which the beam hopping sequence is to be updated and configure a respective one or more beamforming networks associated with the determined one or more satellite beams to be responsive to receipt of a synchronisation pulse, (iii) issue a control command to the synchronisation pulse generator to release a generated synchronisation pulse to each of the plurality of beamforming networks at a reset time to enable the reset times to be observed by the ground segment, and to cause the one or more beamforming networks configured to be responsive to receipt of a synchronisation pulse to implement the updated beam hopping scheme at a time synchronised with the reset time and (iv) update the stored beam hopping sequence.

The payload may comprise a master clock generator for generating the master clock signal.

A stored beam hopping sequence may define a plurality of dwell times for the respective plurality of satellite beams, and the plurality of dwell times may be implemented in accordance with the master clock signal.

The reset time may be coincident with the start of a clock cycle of the master clock signal, and the predetermined period between a first reset time and a second reset time may be such that the first and second reset times are separated by an integer multiple of clock cycles of the master clock signal.

The controller may be arranged to determine a first integer number of clock cycles between the first reset time and the second reset time, and to update the first integer to a second different integer at the second reset time to define the number of clock cycles between the second reset time and a third reset time, if the second reset time corresponds to a time of updating the beam hopping sequence.

The predetermined period may correspond to an integer multiple of the duration of a beam hopping sequence.

The control command may be issued at a predetermined time in advance of the next reset time to occur, defined by a time tag associated with the master clock signal.

The storage means may comprise at least a first memory location and a second memory location, wherein the first memory location may be arranged to store the beam hopping sequence and the second memory location may be arranged to store the updated beam hopping sequence.

According to another aspect of the present invention, there is provided a gateway comprising a communication means for transmitting a plurality of data frames to a satellite payload via an uplink and for transmitting control information to the satellite payload via a control channel, and a controller for controlling the communication means to transmit the data frames according to a data sequence synchronised with a master clock signal common to the ground station and the satellite payload, and to transmit information to the payload defining an updated beam hopping sequence for the satellite payload, wherein the controller is configured to observe an update to the beam hopping sequence at the satellite payload, and determine a first point in time at which an instruction to update the beam hopping sequence was released, wherein the controller is arranged to determine a series of second points in time, calculated based on the first point in time, at which a future instruction to update the beam hopping sequence is capable of being released, and to configure one or more ground stations to update a respective data sequence used by the respective one or more ground stations at a time corresponding to one of the second points in time in response to a further update to the beam hopping sequence occurring a time synchronised with the one of the second points in time.

The controller may be further configured to align data frames in the data frame sequence with switching defined by a beam hopping sequence by at least one of adjusting data symbol rate in the data transmission, adjusting data frame start time for the data transmission, inserting or removing pilot signals from data frames.

According to another aspect of the present invention, there is provided a communication system comprising the above satellite payload and the above gateway, wherein the payload is arranged to communicate with the one or more further ground stations and is arranged to synchronise with the one or more further ground stations using information provided by the gateway.

According to another aspect of the present invention, there is provided a method of beam hopping system synchronisation performed at a gateway of a communications network, comprising determining a data sequence for transmitting data from the gateway to a satellite payload configured to implement a beam hopping sequence, wherein the data frame sequence is synchronised with a master clock signal common to the gateway and the satellite payload, transmitting an updated beam hopping sequence to the satellite payload, observing an update to the beam hopping sequence at the satellite payload, and determining a first point in time at which an instruction to update the beam hopping sequence was released, determining a series of second points in time, calculated based on the first point in time, at which a future instruction to update the beam hopping sequence is capable of being released, and configuring one or more ground stations to update a respective data sequence used by the respective one or more ground stations at a time corresponding to one of the second points in time in response to a further update to the beam hopping sequence occurring a time synchronised with one of the second points in time.

The ground station may further align data frames in the data frame sequence with switching defined by a beam hopping sequence by at least one of adjusting data symbol rate in the data transmission, adjusting data frame start time for the data transmission, inserting or removing pilot signals from data frames.

Embodiments of the present invention enable a BHS to be changed without losing connectivity between the satellite and ground segments of the communication system. Embodiments of the present invention achieve this synchronisation in a manner which does not require interpretation of a timing signal, by the ground segment, but is based on anticipation of the exact time at which change in BHS occurs at the satellite. Embodiments provide more efficient and more accurate synchronisation between the ground and satellite segments than that which is currently available.

BRIEF DESCRIPTION OF DRAWINGS

Embodiments of the present invention will be described, by way of example only, with respect to the following illustrations, in which.

DETAILED DESCRIPTION

Figure 1:
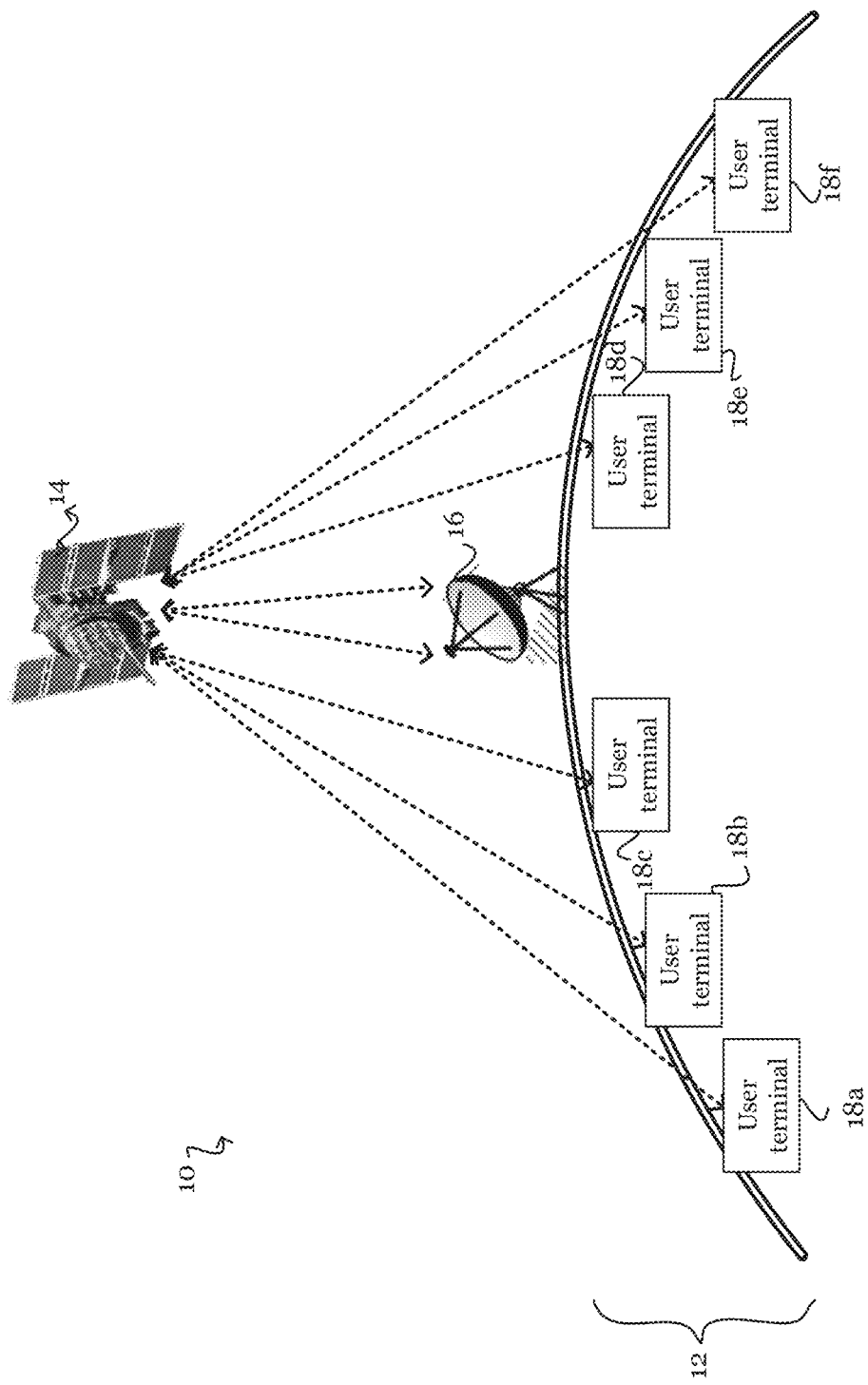
FIG. 1 illustrates a communication system according to embodiments of the present invention.

FIG. 1 illustrates a communication system 10 according to embodiments of the present invention. The communication system 10 comprises a ground segment 12 and a satellite 14. The ground segment 12 contains a gateway 16 referred to herein as a reference gateway, which is illustrated as serving one or more user terminals 18a-f via the satellite 14, although it will be appreciated that there is no restriction on the number of user terminals which can be served. The reference gateway 16 is in communication with the satellite 14 and transmits data to the satellite 14 via an uplink and receives data from the satellite via a downlink.

The reference gateway 16 contains a network controller (not shown) which controls and manages operational functions of the ground segment 12, such as synchronisation of data switching sequences, as described below. In the present embodiments, the network controller also controls and manages operational functions of the satellite 14, to be described below. In other embodiments, the satellite management and control function is performed by a satellite control centre, SCC, which is positioned separately in the ground segment 12 from the reference gateway 16.

The satellite 14 is configured in any orbit or combination of orbits appropriate for serving the needs of the communications system 10. The satellite 14 communicates with the reference gateway 16 according to a BHS, in which beam-forming networks in the satellite 14 configure a transmission or reception beam to serve a particular user terminal in a particular geographical area for a corresponding dwell time, before switching to serve a different user terminal in a different geographical area for a new corresponding dwell time. Each of a plurality of transmit beams, a plurality of receive beams, or a combination of transmit and receive beams, can be configured according to a respective BHS.

Configuration of the satellite 14 is controlled from a ground station which, in the embodiments of FIG. 1, is the reference gateway 16. The reference gateway 16 in the present embodiments is responsible for uploading beam hopping sequences to the satellite 14, and configuring operational parameters such as frequency and power schemes, in accordance with changes to traffic, environment, interference, usage and so on.

Figure 2:
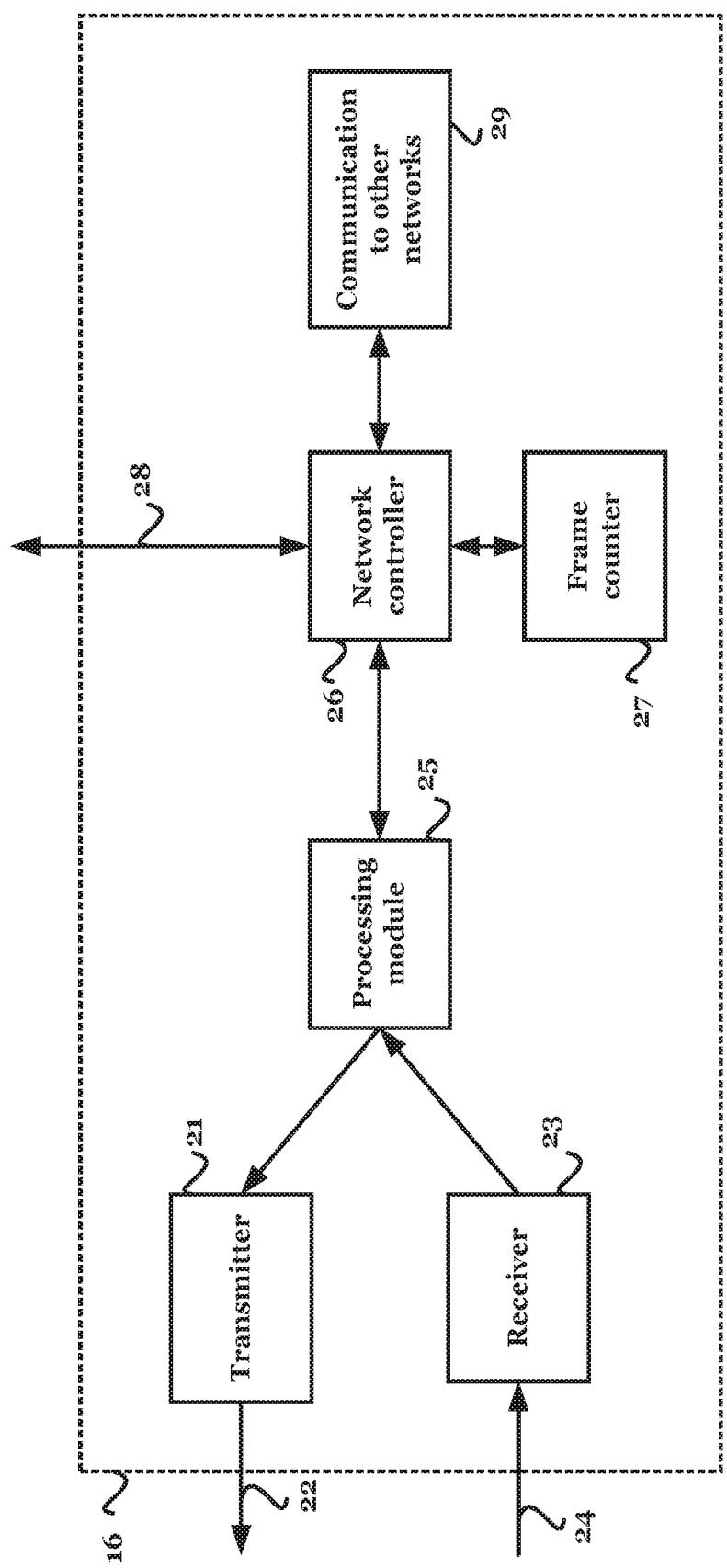
FIG. 2 illustrates a gateway according to an embodiment of the present invention.

FIG. 2 illustrates a detailed configuration of the reference gateway 16 of FIG. 1 according an embodiment of the present invention. The reference gateway 16 comprises a transmitter 21 for radiating a signal to the satellite 14 via an uplink 22, and a receiver 23 for receiving a signal from the satellite 14 via a downlink 24. Communication with the satellite 14 may employ any of a number of multiplexing schemes, such as time division, frequency division, or combinations therebetween. The reference gateway 16 comprises a processing module 25 for processing signals for transmission and for processing received signals, as known in the art, including analogue-to-digital conversion means, digital-to-analogue-conversion means, amplifiers, modulation and demodulation means, filtering and the like. The reference gateway 16 also comprises a network controller 26, and a frame counter 27, to be described below. The network controller 26 is implemented by one or more processor and associated memory and communicates with the satellite over a control channel 28 which is separate from the traffic channels used in the uplink 22 and downlink 24, and also communicates with the processing module 25. The reference gateway 16 may comprise a communication means 29 for communication with other external networks, such as the world wide web.

The processing module 25 implements a data switching scheme in which a multiplexing scheme, such as a time division multiplexing (TDM) is applied to time slots in data frames of signal transmission to and reception from a satellite.

Figure 3A:
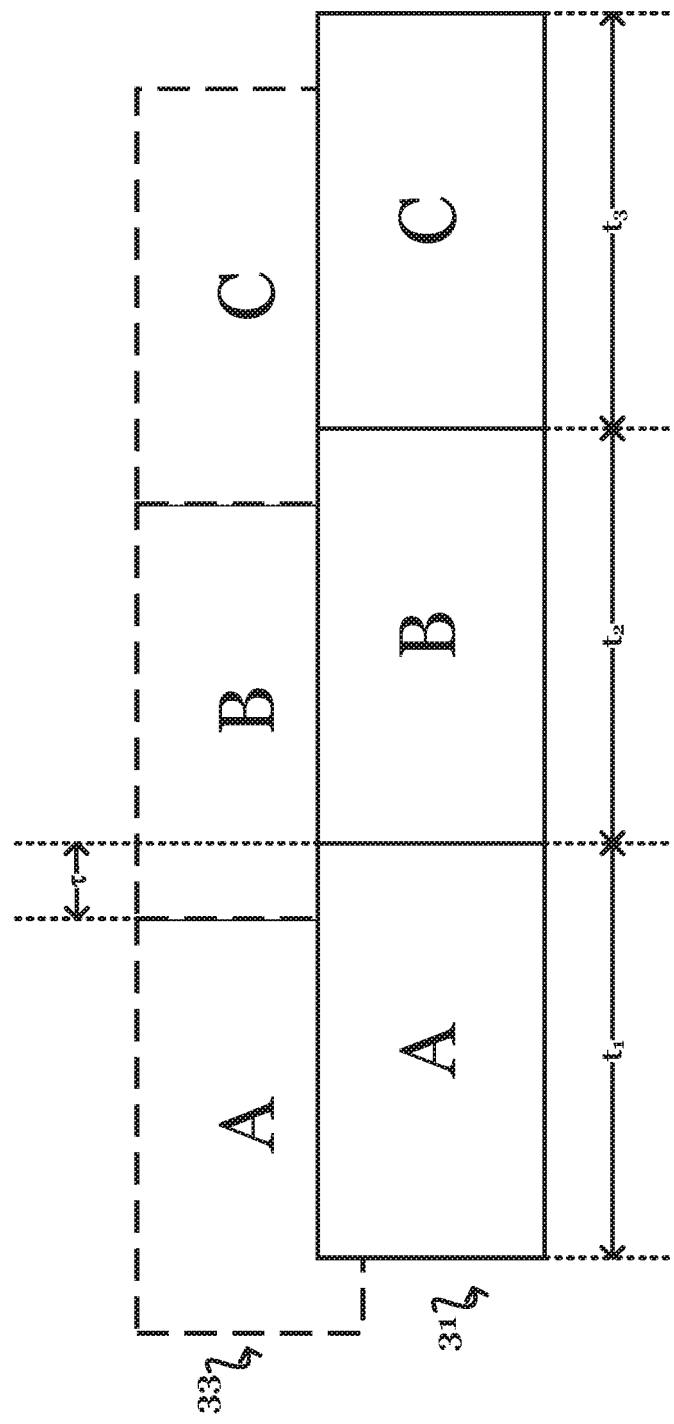
FIGS. 3A and 3B illustrate the principle of beam hopping sequence switching as used by embodiments of the present invention.

FIG. 3A illustrates an example of a frame of a data switching sequence of a digital signal to be transmitted according to a first data switching sequence 31, in which data is to be transmitted from a user terminal in a local geographical area to user terminals in three different remote geographical areas via the satellite 14 based on a time division multiplexing scheme. Timeslot $t_1$ includes data to be transmitted to user terminal A. Timeslot $t_2$ includes data to be transmitted to user terminal B. Timeslot $t_3$ includes data to be transmitted to user terminal C. After $t_3$, a new frame begins, and data is transmitted to user terminal A again. The boundaries between timeslot $t_1$ and $t_2$, and between timeslot $t_2$ and $t_3$ are referred to herein as data switching times.

Figure 3B:
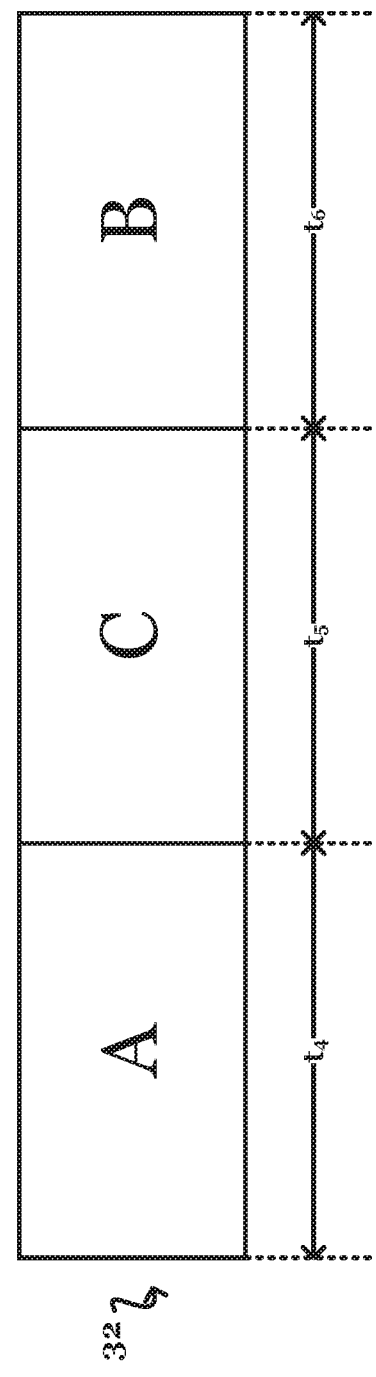

FIG. 3B illustrates a data frame used in signal transmission according to a second data switching sequence 32. Timeslot $t_4$ includes data to be transmitted to user terminal A. Timeslot $t_5$ includes data to be transmitted to user terminal C. Timeslot $t_6$ includes data to be transmitted to user terminal B.

In the examples shown in FIGS. 3A and 3B, timeslots $t_1$-$t_6$ may be of equal duration to each other, or may each have different durations.

The satellite 14 implements a BHS in order to transmit the data to user terminals A, B and C on a time-division basis, and adjustment of the BHS in the satellite 14 from sequence A→B→C to sequence A→C→B requires a corresponding change in the ground data switching sequence from the first sequence of FIG. 3A to the second sequence of FIG. 3B.

In order to optimise the routing of data to the user terminals in embodiments of the present invention, the BHS is aligned with the time slots of the data frame in the signal transmission so that the ground data switching and the antenna switching are aligned, according to a process to be described in more detail below. The alignment is with respect to a master clock which may be derived from a master oscillator in the satellite, or a clock signal provided from an external reference which may be a ground station or another satellite in the satellite segment. When the ground data switching and antenna switching are aligned, the data switching times in the ground segment correspond to the data switching times in the satellite, subject to a propagation delay, τ, to account for the propagation of signals from the ground segment to the satellite segment. The propagation delay may be fixed or dynamically determined by the network controller of the reference gateway, based on knowledge of the relative position of the satellite and the reference gateway.

An example of a BHS for a single transmit beam at the satellite 14, which corresponds to the first data switching sequence 31 of FIG. 3A is illustrated in FIG. 3A in dotted lines 33, showing the hopping of the transmit beam from area A to area B to area C.

Alignment of Antenna Switching and Ground Data Switching

Prior to the alignment of the sequence switching on the ground and at the satellite, to reflect a BHS update, to be described in more detail below, a process is performed in order to verify alignment of the switching within data frames at the ground segment and the antenna of the satellite, according to embodiments of the present invention.

The reference gateway 16 aligns data switching for the ground segment 12 as a whole based on observation of at least one hop in a sequence. The reference gateway 16 is able to observe a hop in the beam sequence either by identifying, with respect to the master clock, the time at which the reference gateway 16 ceases to be in a beam coverage area in which it was previously located, or the time at which coverage of the reference gateway 16 begins. The timing of observation of hop will correspond to the time of the hop as implemented in the satellite 14, added to the propagation delay r. Observation of more than one hop enables the reference gateway 16 to verify its own observation times, perform averaging and so on, which can avoid observation problems caused by instantaneous obstruction to signal receipt, for example.

The observed time is correlated with the data switching time of the ground segment 12, which is known by and controlled by the network controller 26. If there is already alignment, no adjustment is required. If, however, the frames of data communication at the ground segment 12 are not aligned with the timing of hop, the network controller 26 performs one or more of adjustment of data symbol rate and data frame start time by advancing or retarding the start of a frame used in the time division multiplexing scheme.

As well as performing this process prior to implementing of alignment of sequence switching, the alignment can also be maintained on an ongoing basis during traffic operations. In these circumstances, the network controller 26 can anticipate small deviations due to, for example, slight relative positional changes between the reference gateway 16 and the satellite 14, or drift in clock signals, and can perform "fine tuning" in contrast to the "coarse tuning" that might be employed prior to sequence alignment as described above. While coarse tuning can be performed using symbol rate adjustment and application of time delay or advancement to the data frames, fine tuning can be performed by use of pilot signals in the data stream.

Pilot symbols are effectively dummy signals having no information content, which represent a single clock cycle. The pilot signals can be inserted into a data frame in order to increase the length of the data frame, or removed from the data frame in order to decrease the length of the frame. In this manner, the data frame period can be finely adjusted based on a particular number of clock cycles without changing the information content of the data frame, and without compromising the use of the multiplexing scheme.

Synchronisation of the data format across the ground segment 12 as a whole is achieved by firstly synchronising the data frames at the reference gateway 16, and associated local user terminals to the beam hops at the satellite 14 as described above, and then the synchronisation information (such as information specifying timings with respect to the master clock), accounting for propagation delays, is forwarded to user terminals 18a-f over the "forward link", namely the uplink 22 between the reference gateway 16 and the satellite 14 and the downlink between the satellite 14 and the user terminals 18a-f.

Update of Beam Hopping Sequence

The beam hopping sequences in the satellite 14 can be updated over time by the network controller 26. In some embodiments, the network controller 26 stores a plurality of BHSs to be used over a particular future time period, such as a week, reflecting a particular communication schedule. For example, in the case of a system in which the data to be transmitted reflects local television content to be provided to a plurality of different geographical areas, a plurality of different BHSs may be employed based on a television programme schedule. For example, the number of user terminals to be served may be different overnight than during the day, and the number of user terminals to be served at any particular time may vary based on the particular time zone corresponding to the geographic location of the user terminal. The beam hopping sequence may be adjusted for other reasons, however, such as preservation of security by obstructing fraudulent access to transmitted data.

The network controller 26 of the reference gateway 16 is synchronised with a master clock, as described above, and is able to determine a current time using Co-ordinated Universal Time (UTC), for example, although it will be appreciated that other timing systems can be used. The BHSs stored by the network controller 26, are stored with a corresponding implementation time, referred to herein as a "time tag", such that the network controller 26 is able to determine from the current time when it is time for a particular BHS to be employed. In embodiments of the present invention, the network controller 26 anticipates implementation a substantial time in advance, such as a day, before the implementation time, in order to prepare the satellite 14 to implement a new BHS without delay, which ensures rapid and predictable BHS update times at the satellite 14.

When it is determined that the current time is a predetermined period such as 24 hours prior to a scheduled BHS time, based on monitoring of UTC time provided by the master clock, the network controller 26 initiates a "load", "arm", "fire" technique, described below with reference to FIG. 4, instigated by the determination that the current time is a predetermined time in advance of BHS implementation in step S41. The "load" step S42 involves the uploading of one or more new BHSs to the satellite 14 via the uplink 22. The BHS(s) may be uploaded as a control signal from the network controller 26 to the satellite 14, carried in a control channel at a separate frequency from data transmission to user terminals, such as content (e.g. television content, media, messages, internet data and so on). In other embodiments, the BHS(s) may be included within a traffic channel. The updated BHS(s) is stored in a memory on board the satellite.

The uploaded data contains an indication of a particular beam having a BHS to be updated, the new coverage dwell times for the new BHS, and the time tag for the BHS based on UTC. The provision of the time tags means that the "fire" command S44, to be described below, is effectively lodged with the satellite 14 a day before it is required, in this example. The indication of a beam may in some embodiments be based on a beam-indexing scheme, which is defined and agreed in advance between the network controller 26 and the satellite 14.

Figure 5:
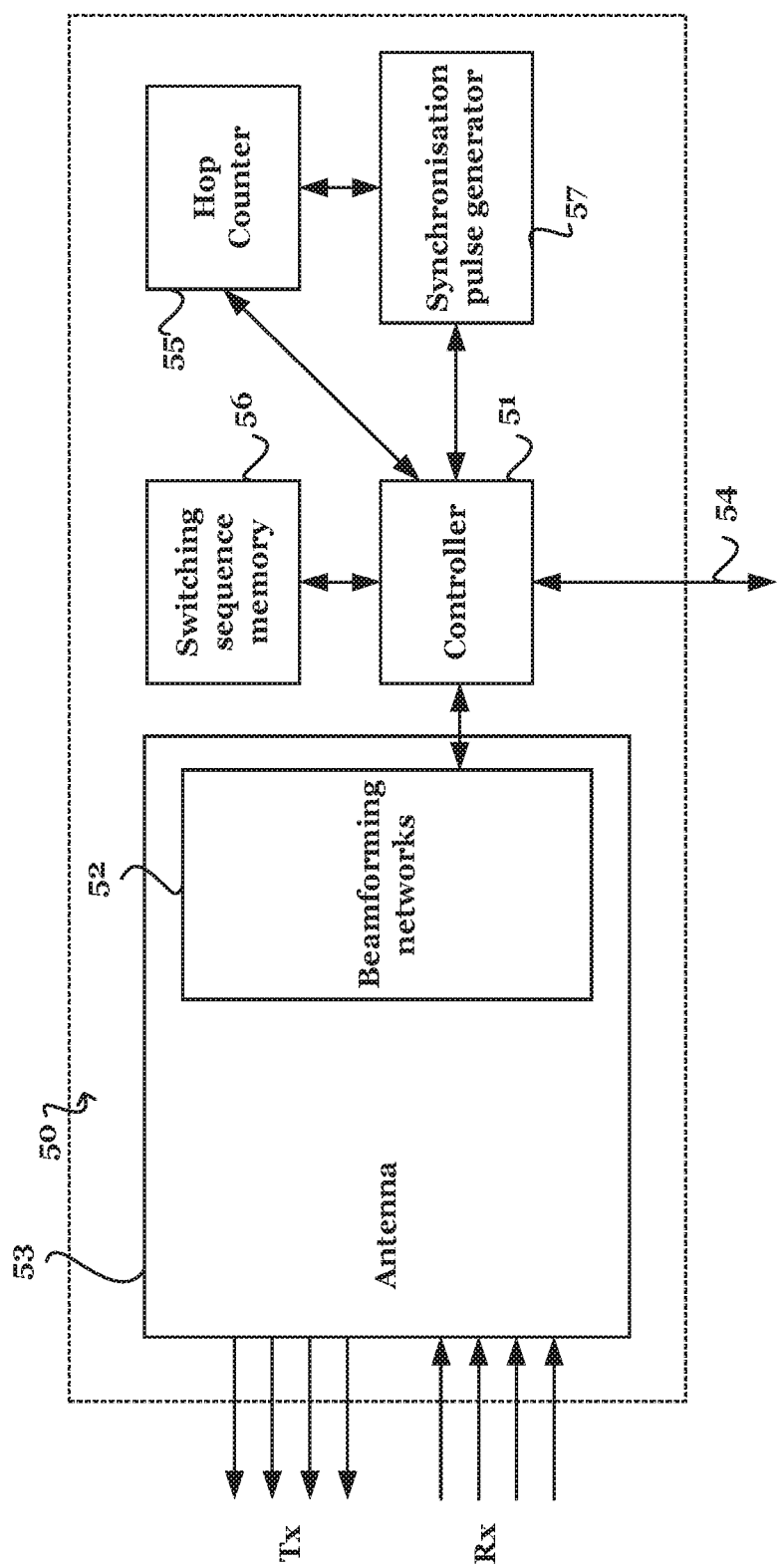
FIG. 5 illustrates a satellite payload according to embodiments of the present invention.

FIG. 5 illustrates a satellite payload 50 of a satellite 14 according to embodiments of the present invention. The operations of the satellite 14 are controlled by a controller 51, which controls receive and transmit beamforming networks 52 for a communications antenna 53 to communicate with a ground station, using a plurality of transmit, Tx, and receive, Rx, beams, and which communicates with a network controller 26 on the ground via a control channel 54.

The beamforming networks 52 may be of a conventional form, enabling transmit and receive beams to be orientated using, for example, weighted addressing of elements in a phased array antenna, and detailed description thereof is omitted in the interest of clarity. The orientation of each transmit and receive beam is controlled in accordance with a respective BHS. The controller 51 is able to derive the required weighted addressing of the elements, and the associated sequencing from a respective BHS and to control the beamforming networks 52 to apply the weighted addressing in the required sequence for each of the required communication beams. The controller 51 uses a hop counter 55 provided by an on-board clock in order to determine when a particular dwell time for a transmit or receive beam, as defined by its respective BHS, has expired and to instruct the beamforming networks 52 to redirect the beam to its new coverage area. The clock serves as the master clock to which the reference gateway 16 is synchronised.

The controller 51 implements one or more BHSs which are stored in a switching sequence memory 56, and the controller 51 is capable of communication with a reference gateway 16 in the ground segment 12 to receive control information from a network controller 26, including a new BHS. The switching sequence memory 56 comprises storage for the currently implemented BHSs and updated BHSs which are to be employed at points in time in the future. The storage may be arranged as two discrete memory locations or as addressable components of a single memory, and the memory may be implemented using conventional means such as a solid state memory or hard disk, and may also store additional operational information such as control information received from the network controller 26 regarding system configuration, transmit power, interference cancellation instructions and so on.

On updating a BHS, the storage of the previous BHS is cleared, and the cleared memory is used to store a newly received BHS from the network controller 26. Following the "load" step of FIG. 4, the updated BHS is stored in an available memory location, thus replacing the storage of a prior BHS which has ended. In this manner, the switching sequence memory 56 always has available the current BHS and the next BHS (where needed) for each beam so that antenna switching can be performed seamlessly.

Figure 4:
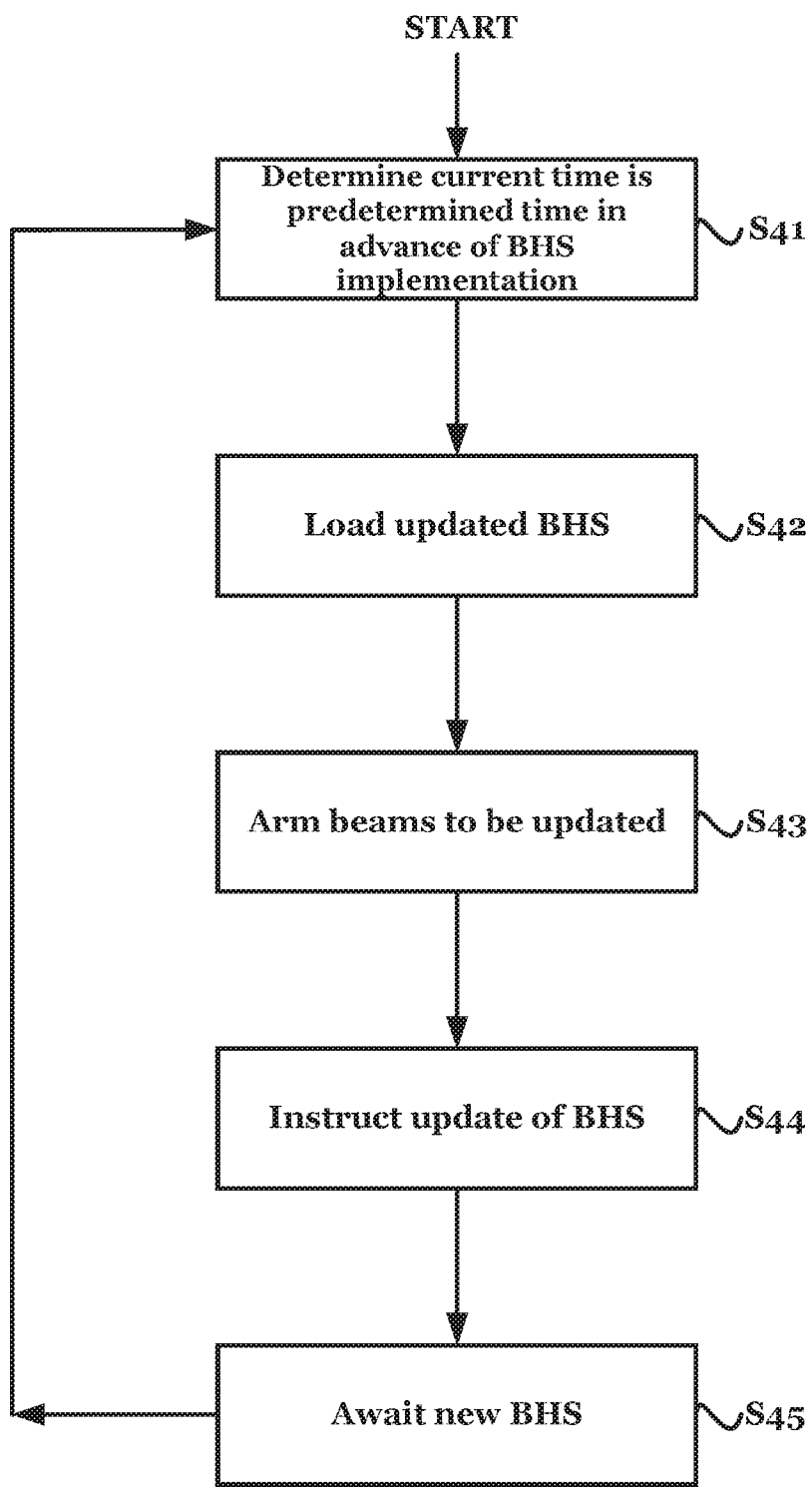
FIG. 4 illustrates a control method for instructing the update of a beam hopping sequence according to embodiments of the present invention.

The next stage illustrated in FIG. 4 is an "arm" instruction S43. The arm instruction is a mechanism for preparing a subset of the communications beams of the satellite 14 to be updated. Having armed the required communication beam(s), a single fire command S44 can be issued to instruct the update, and only the armed beam(s) will be updated through corresponding configuration of the respective beamforming network(s) 52. This technique avoids the need to issue separate update instructions to each required beam.

Typically, the arming process occurs of the order of a few seconds, in one embodiment three seconds, prior to the issue of the fire command S44. The prior registration of the fire command through the load operation S42 explained above means that the satellite controller 51 can anticipate that the fire command is due to be required, and can prepare to arm the required beams a few seconds in advance.

Arming of a beam can be performed in a number of ways. As described above, the switching sequence memory storage 56 stores a BHS to be applied to each beam. For example, transmit beam #1 may be cycled between geographical areas A, B and C. Transmit beam #2 may be cycled, in parallel with transmit beam #1, between geographical areas D, E and F. Due to a required update in configuration, in the present example, transmit beam #2 is to be cycled between geographical areas B, F and G according to the new BHS, but transmit beam #1 is to remain unchanged. In some embodiments, the controller is configured to store a particular flag in association with each beam in the switching sequence memory. On receipt of the new BHS from the network controller, the flag can be set as a zero, or "No" for a beam which is not to be updated, and as a one or a "Yes" for a beam configuration which is to have a new BHS. In the present example, update flag "0" would be stored in connection with transmit beam #1, while update flag "1" would be stored in connection with transmit beam #2.

The satellite controller 51 determines that a beam is to be armed by analysing the newly received BHS information received from the network controller 26 and comparing it with the currently employed BHS for each beam in order to identify the differences therebetween. Alternatively, the newly received BHS information includes the corresponding beam index/indices as well, so that the beam(s) to be updated can be identified directly from the BHS received information. The newly received BHS information may contain all of the BHSs to be applied to all beams, whether updated or the same as a previous BHS, with the satellite controller 51 processing the received information as described above. Alternatively, the information received from the network controller may already reflect a "delta" or instruction to change the BHS of a particular beam, so that if no BHS change instruction is provided from the network controller 26, the satellite controller 51 continues to implement the currently active BHS(s).

The final stages in the sequence of FIG. 4 are the "fire" stage S44, associated with the implementation of an update to the beam hopping sequence, and a waiting stage S45 after which the system will await a new instruction to update a BHS to start a new cycle from step S41. The loop from step S45 can be S41 be broken and the sequence of FIG. 4 ended on provision of a control signal to that effect from the network controller 26.

The beam hopping sequence update procedure is initiated by the release of a synchronisation pulse generated by a synchronisation pulse generator 57 in the satellite payload 50 which continually generates synchronisation pulses on a periodic basis. The synchronisation pulse is a control signal of a predetermined signal strength and duration, but may in other embodiments comprise a predetermined control sequence or word. The synchronisation pulse is advantageously configured to be as simple as possible to interpret by the satellite controller 51, so as to avoid unnecessary implementation delay and to enable BHS updates to occur seamlessly.

The release of the synchronisation pulse comprises the provision of the pulse to the controller 51 over a wired or wireless data link between the synchronisation pulse generator 57 and the controller 51, and to the beamforming networks 52. Without a release instruction, the synchronisation pulse generator will generate a pulse which is registered in a buffer or the like, and deleted or replaced by a subsequently generated pulse. The release can take the form of the transmission from the buffer to the satellite controller 51 and beamforming networks 52, but may in other embodiments simply represent a switching control implemented in accordance with a counter period to be described below, in which a switch between the synchronisation pulse generator 57 and the satellite controller 51 and beamforming networks 52 is closed periodically.

By configuring the synchronisation pulse generator 57 to generate a pulse periodically, it is not necessary to perform a process of instructing the generator 57 to generate a pulse whenever specifically required, which might be associated with an implementation delay, and it is only necessary to determine the point at which a generated pulse is to be released.

In some embodiments, the synchronisation pulse generator 57 is configured to generate synchronisation pulses at a plurality of different counter periods, one for each of a plurality of beams to be employed. In other embodiments, a plurality of synchronisation pulse generators is used. In the following description, references to the synchronisation pulse generator 57 shall be understood as applicable to a plurality of synchronisation pulse generators.

In response to, or a predetermined time after the release of the synchronisation pulse, new BHS(s) which have been loaded in advance in the sequence switching memory 56, are applied to the respective beamforming networks 52 of the satellite 14, for application to a particular beam(s) armed as described above. The beamforming networks 52 are configured, in the arm stage S43, to be responsive to the synchronisation pulse (through ignoring the synchronisation pulse or being instructed to switch to a new BHS) released to all of the beamforming networks 52, based on the state of the flag, for example, as illustrated above. The update to the BHS is thus performed at a time which is synchronised with (either at the same time as, or a known delay from) the synchronisation pulse release.

The fire command S44 is a control command issued by the satellite controller 41, or in other embodiments, by the network controller 26, to the synchronisation pulse generator 57 based on a comparison between a time tag for a particular BHS and the current time, measured based on the satellite clock. In the present embodiments, the fire command S44 is issued within a predetermined tolerance (of the order of 500 ms in some embodiments) of a time set by the UTC scheduling.

The fire command S44 enables sufficient time for the next synchronisation pulse in the sequence to be generated and released. In some embodiments, it is desirable for the fire command S44 to be issued of the order of tenths of a second, for example 100 ms, in advance of the scheduled release of the synchronisation pulse, which can be achieved by the satellite controller 51 with knowledge of the counter period, but can in other embodiments be achieved by the network controller 26 once synchronised with the antenna switching.

Once the synchronisation pulse is released to the controller 51, the new BHS is applied. As described above, in some embodiments, the starting point of the new BHS may occur at a fixed time period after the release of the synchronisation pulse. In some embodiments, the fixed time period is configured to enable the new BHS to start at the end of the previous BHS, such that if a counter period expires during a BHS, the BHS is completed.

In some embodiments, the counter period is defined in the BHS update information provided from the network controller 26. In other embodiments, the counter period is provided separately by the network controller 26 and can be updated on-the-fly by the satellite controller 51. The counter period is chosen to be commensurate with both the release uncertainty, i.e. the time period between the fire command S44 and the release of the synchronisation pulse, and an implementation delay between update between the release of the synchronisation pulse and the update of the BHS. In other words, the counter period is sufficiently long to ensure that a fire command S44 can be executed sufficiently far in advance of a wanted synchronisation pulse release point to allow implementation.

An updated BHS may have a different counter period from a prior BHS, and the counter period may thus be reset and updated when a BHS is updated. In some embodiments, the counter period is configured to have a duration which is an integer multiple of the BHS period, and in such cases, a synchronisation pulse will be released at the end of a BHS. In other embodiments, however, the counter period need not be so defined, such that a BHS update can occur during a prior, and thus incomplete, BHS.

After the BHS update is complete, all beams are disarmed, through clearing of the update flag for each beam, for example, until a further new BHS is received.

Synchronisation of Antenna Sequence Switching and Ground Data Sequence Switching The description above illustrates the principle by which an update to a beam hopping sequence is performed at the satellite 14. The following describes the process by which the update to a BHS is synchronised with a corresponding update to the ground data sequence switching.

In general terms, the principle of synchronisation of the sequence switching is based on the determination of a sequence of exact future times at which the ground segment 12 can expect a BHS update to occur, such that a BHS update can be reflected in ground data sequence switching seamlessly.

The hop counter, 55 is used by the satellite controller to indicate what is referred to herein as a "counter period", namely a predetermined period of time representing a particular number of clock cycles between instants of time which shall be referred to herein as "reset times". The reset times are instants in time at which the counter period can be reset and adjusted to a new counter period, although the counter period does not need to be reset every time a reset time occurs. The determination of the length of a counter period is described in more detail below.

The synchronisation pulse generator 57 is controlled by the controller 51 to generate synchronisation pulses periodically, at the point of a counter reset, i.e. at a reset time. A generated synchronisation pulse is released, i.e. provided to the controller as described above, when a BHS is to be updated. It thus follows that the BHS update procedure is initiated at a time which can be predicted with respect to the reset times, and so what is required of the ground segment 12 is visibility of, and synchronisation with, the reset times.

In order to achieve this, the reference gateway 16 firstly captures an instance of the release of the synchronisation pulse by observing an update to a BHS. Observation of an update to a BHS is performed by the reference gateway 16 in a similar manner to the identification of one or more hops in the switching alignment process described above. The reference gateway 16 identifies that a coverage sequence has changed by, for example, observing a change in the dwell time of a particular beam coverage, or identifying a change in the sequence of beam coverages from particular beams. The reference gateway records an observation time, corresponding the perceived time of change of the BHS in the satellite 14, the observation time determined with respect to the master clock. The observation time will, in practice, correspond to the time at which the BHS occurred at the satellite 14, with an additional propagation delay, τ.

Next, the reference gateway 16 correlates the observation time with a position in its data switching sequence. The ground data switching and antenna switching are aligned as a result of the alignment process illustrated above, and so if the propagation delay, τ, is known, the observation time can be correlated exactly with data switching sequence. Accordingly, the start of a BHS update can be synchronised with the data switching sequence.

As set out above, a new BHS may have a different period from the previous BHS, reflecting a greater or smaller number of coverage areas and/or dwell times. When a BHS update is performed at the satellite 14, the change in duration of the new BHS with respect to the previous BHS is reflected by an update to the counter period by the satellite controller 51, which changes the time period at which a synchronisation pulse is generated 57, and accordingly, changes the sequence of possible synchronisation pulse release instances. In some cases, however, the counter period after an update is the same as the counter period prior to the update.

The new counter period, implemented by the satellite controller 51 and applied to the hop counter 55, is known to the network controller 26 of the reference gateway 16 as it is programmed in advance, together with the BHS, at the network controller 26, and uploaded to the satellite 14. As such, the reference gateway 16 knows, once a BHS update is implemented in the satellite 14, both the position, with respect to the data switching sequence, of the update, and the period of time at which future updates might occur, which will be at integer multiples of the new counter period, measured from the observation time.

The reference gateway 16 communicates this information to the user terminals 18a-f in the ground segment 12 via the forward link, and implements a change in the data switching sequence which is employed in order to reflect the updated BHS in the satellite 14. Since the user terminals 18a-f are informed, by the reference gateway 16, of the new counter period and the observation time of the previous BHS update, with respect to the data switching sequence, and the series of potential instances or points in time at which BHS updates can occur at the satellite segment, it is possible for the user terminals 18a-f to anticipate and observe the exact time at which a BHS update can occur, and to implement a change in the data switching sequence of the return link seamlessly.

At a future BHS update point, the reference gateway 16 is able to operate by anticipating an update point and updating the ground segment 12 but observation of the future BHS update is not required.

The anticipation of a BHS update point is particularly advantageously performed in embodiments in which the counter period is chosen to be an integer multiple of the BHS duration. In this manner, it is possible for ground stations to anticipate potential BHS update points based on counting of the BHS frames, as it will be known that a BHS update will only ever be performed at the end of a BHS frame. In some embodiments, the counting of the BHS frames is performed by a frame counter, such as the frame counter 27 in the reference gateway 16, which logs the occurrence of an observed hop and increments a frame counter 27 for each occurrence. In other embodiments, the frame counter 27 may be integrated with other processing architecture of a gateway, such as the processing module 25 of the reference gateway 16.

Figure 6:
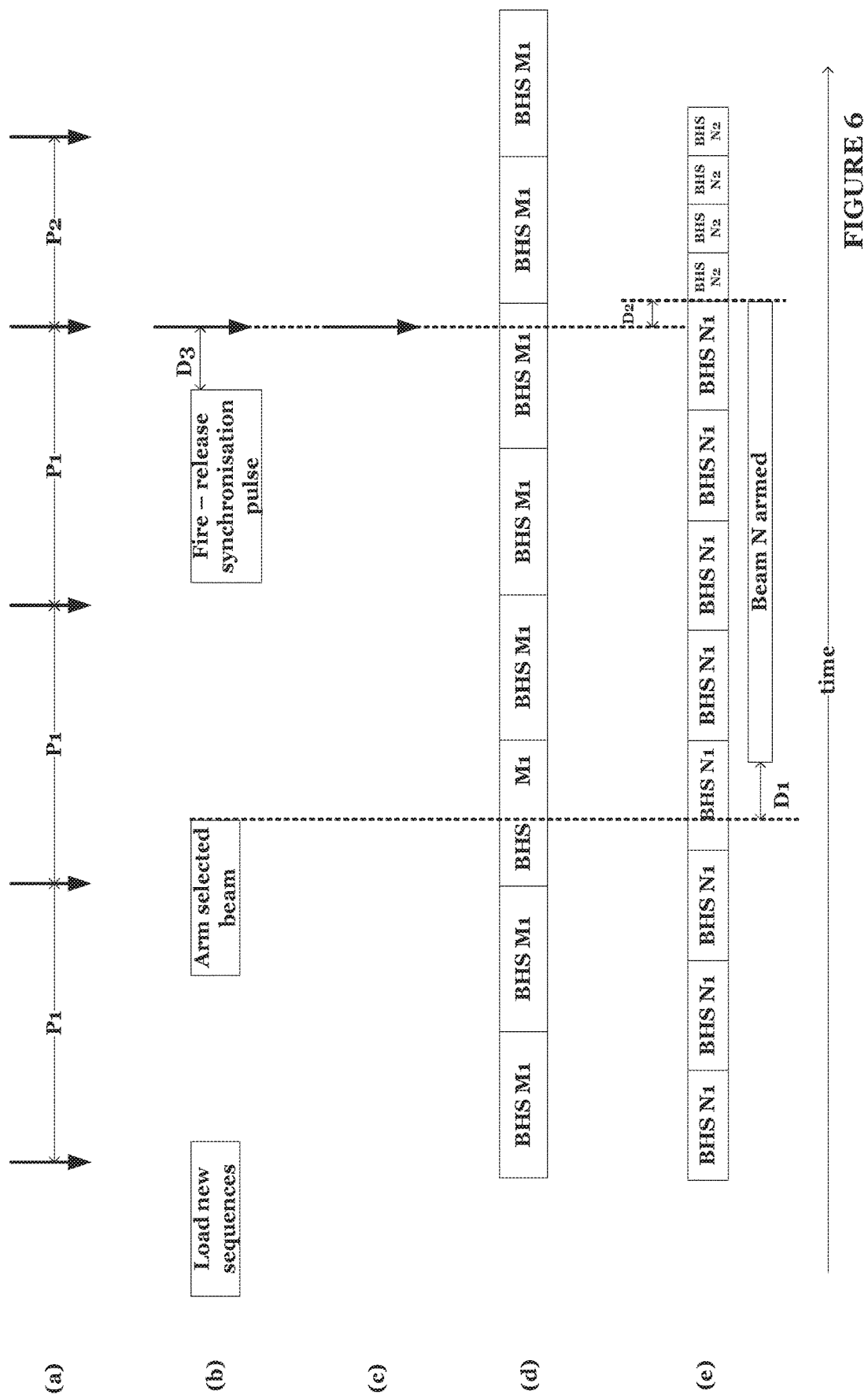
FIG. 6 is a timing diagram illustrating the update of a beam hopping sequence according to embodiments of the present invention.

FIG. 6 illustrates a timing diagram of signals embodied by the satellite payload of an embodiment of the present invention, based on the principle described above. The diagram illustrates (a) a synchronisation pulse generation timing with a counter period P1 before and a shorter period P2 after a BHS update, (b) the timing of "load", "arm" and "fire" commands issued to the network controller 26 in accordance with the flow chart of FIG. 4, (c) the release of a synchronisation pulse generated by the synchronisation pulse generator 57, (d) the non-update of a BHS (Ml) in non-armed beam M, and (e) the update of a BHS in an armed beam N from BHS N1 to BHS N2. In FIG. 6(b), the timing between the "load" and "arm" commands is shortened from the embodiments described above in which the load command is lodged well in advance of the arm command, for convenience of illustration. An implementation delay, D1, between the conclusion of the arm command in FIG. 6(b) and the start of arming of beam N in FIG. 6(e) is illustrated, while a predetermined delay, D2, between the execution of the update to the BHS for beam N, with respect to the release of the synchronisation pulse in FIG. 6(c) is illustrated. A window of time, D3, between the conclusion of the fire command in FIG. 6(b) and the release of the synchronisation pulse in FIG. 6(c) is also illustrated.

Modifications

A number of modifications to the embodiments described above are possible which fall within the scope of the present invention, as defined by the claims. In addition, combinations of features of compatible embodiments, as will be understood by the examiner, also fall within the scope of the present invention.

The satellite segment has been described above in connection with a single satellite, but it will be appreciated that a plurality of satellites may be present, communicating with each other via inter-satellite links, and the principles of synchronisation in the invention can be applied to the plurality of satellites in the same way as a single satellite.

In the satellite payload, a controller has been illustrated in the embodiments above, but in other embodiments, separate controllers can be used for switching control, implement the principles described above, while a separate on-board controller, OBC, can be used to implement other functions of the payload, e.g. communication of control information to the network controller.

In the ground station, it has been described that the reference gateway comprises a network controller. In other embodiments, the network controller for the satellite segment takes the form of a standalone SCC dedicated to configuring and managing the satellite segment. The SCC is arranged to operate on the basis of instructions determined on a timetable defined by UTC, whereas the switching controller in the satellite payload is arranged to operate on the basis of the master clock signal.

The various components of embodiments of the present invention can be implemented using hardware, software, or a combination of both. For example, the satellite controller can be implemented as a computer processor programmed with software, programmable from the network controller, but can in other embodiments be implemented based on an array of logic gates and switches.

The skilled person will thus realise that specific implementations are dependent on network architecture and the specific beam hopping sequences to be used, and that the present invention is not limited to any of the specific embodiments described.

The invention claimed is:

1. A satellite payload comprising:
a plurality of beamforming networks;
a communication means arranged to receive data in a data sequence from a ground station of a communications network and to transmit the received data via a respective plurality of satellite beams created by the plurality of beamforming networks;

storage means for storing a beam hopping sequence;

a controller arranged to control transmission of data by the communication means according to the stored beam hopping sequence in a manner synchronised with the data sequence from the ground station; and a synchronisation pulse generator for generating a series of synchronisation pulses, each at a respective clock reset time separated by a predetermined period of time derived from a master clock signal common to the satellite payload and the ground station;

wherein the controller is arranged to:
(i) receive an update to the stored beam hopping sequence from the ground station;
(ii) determine one or more of the plurality of satellite beams for which the stored beam hopping sequence is to be updated and configure a respective one or more beamforming networks associated with the determined one or more satellite beams to be responsive to receipt of one of the series of synchronisation pulses;
(iii) issue a control command to the synchronisation pulse generator to release one of the generated synchronisation pulses to each of the plurality of beamforming networks at the respective clock reset time, and to cause the one or more beamforming networks configured to be responsive to receipt of the synchronisation pulse to implement the updated beam hopping scheme at a time synchronised with the clock reset time to enable the clock reset time to be observable at the ground station; and
(iv) update the stored beam hopping sequence.

2. A satellite payload according to claim 1, comprising a master clock generator for generating the master clock signal.

3. A payload according to claim 1, wherein a stored beam hopping sequence defines a plurality of dwell times for the respective plurality of satellite beams, and the plurality of dwell times are implemented in accordance with the master clock signal.

4. A satellite payload according to claim 1, wherein the clock reset time is coincident with the start of a clock cycle of the master clock signal, and the predetermined period between a first clock reset time and a second clock reset time is such that the first and second clock reset times are separated by an integer multiple of clock cycles of the master clock signal.

5. A satellite payload according to claim 4, wherein the controller is arranged to determine a first integer number of clock cycles between the first clock reset time and the second clock reset time, and to update the first integer to a second different integer at the second reset time to define the number of clock cycles between the second clock reset time and a third clock reset time, if the second clock reset time corresponds to a time of updating the stored beam hopping sequence.

6. A satellite payload according to claim 1, wherein the predetermined period corresponds to an integer multiple of the duration of a beam hopping sequence.

7. A satellite payload according to claim 1, wherein the control command is issued at a predetermined time in advance of the next reset time to occur, defined by a time tag associated with the master clock signal.

8. A satellite payload according to claim 1, wherein the storage means comprises at least a first memory location and a second memory location, wherein the first memory location is arranged to store the beam hopping sequence and the second memory location is arranged to store the updated beam hopping sequence.

9. A satellite payload according to claim 1, wherein the satellite payload is arranged to communicate with one or more user terminals and is arranged to synchronise with the one or more user terminals using information received from the ground station.

10. A ground station comprising:
a communication means for transmitting a plurality of data frames to a satellite payload via an uplink and for transmitting control information to the satellite payload via a control channel; and a controller for controlling the communication means to transmit the plurality of data frames according to a data sequence synchronised with a master clock signal common to the ground station and the satellite payload, and to transmit information to the satellite payload defining an update to a beam hopping sequence for the satellite payload;

wherein the controller is configured to observe the update to the beam hopping sequence at the satellite payload, and determine a first point in time at which an instruction to update the beam hopping sequence was released, and wherein the controller is arranged to determine a series of second points in time, calculated based on the first point in time, at which a future instruction to update the beam hopping sequence is capable of being released, and to configure one or more user terminals to update a respective data sequence used by the respective one or more user terminals at a time corresponding to one of the second points in time in response to a further update to the beam hopping sequence occurring a time synchronised with the one of the second points in time.

11. A ground station according to claim 10, wherein the controller is further configured to align data frames in the data sequence with switching defined by a beam hopping sequence by at least one of:

adjusting data symbol rate in the data transmission;

adjusting data frame start time for the data transmission; or inserting or removing pilot signals from data frames.

12. A method of beam hopping system synchronisation performed at a ground station of a communications network, comprising:

determining a data sequence for transmitting data from the ground station to a satellite payload configured to implement a beam hopping sequence, wherein the data sequence is synchronised with a master clock signal common to the ground station and the satellite payload;

transmitting an update to the beam hopping sequence to the satellite payload;

observing the update to the beam hopping sequence at the satellite payload, and determining a first point in time at which an instruction to update the beam hopping sequence was released;

determining a series of second points in time, calculated based on the first point in time, at which a future instruction to update the beam hopping sequence is capable of being released; and configuring one or more user terminals to update a respective data sequence used by the respective one or more user terminals at a time corresponding to one of the second points in time in response to a further update to the beam hopping sequence occurring a time synchronised with one of the second points in time.

13. A method according to claim 12, wherein the ground station further aligns data frames in the data sequence with switching defined by a beam hopping sequence by at least one of:

adjusting data symbol rate in the data transmission;

adjusting data frame start time for the data transmission; or inserting or removing pilot signals from data frames.

\* \* \* \* \*